Aug. 20, 1929.    S. K. DENNIS    1,725,446
PLANTER VALVE MECHANISM
Filed Dec. 17, 1923
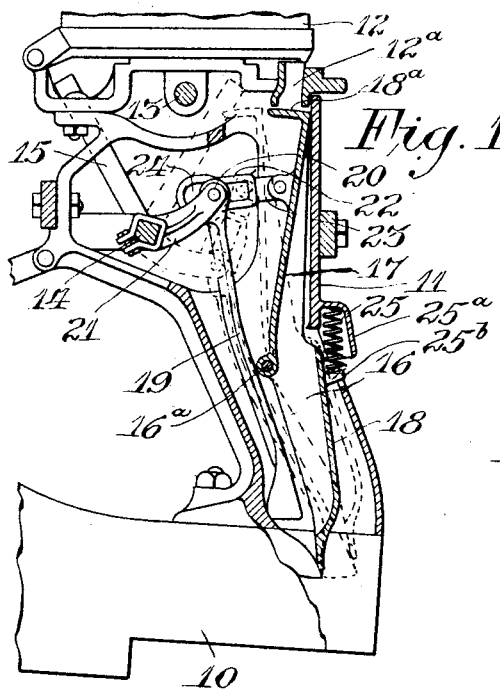
Fig. 1.
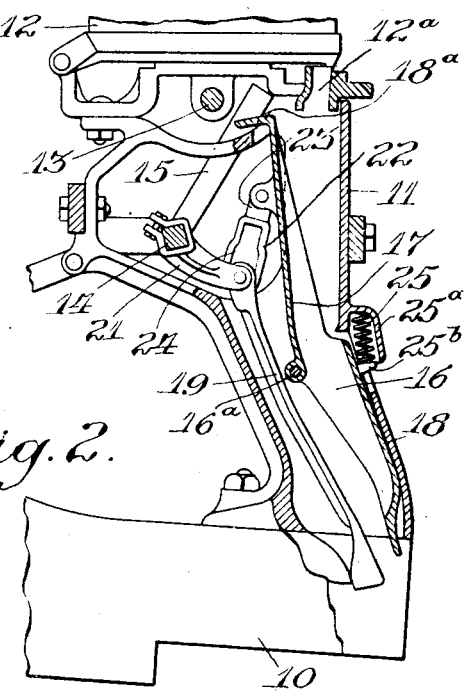
Fig. 2.
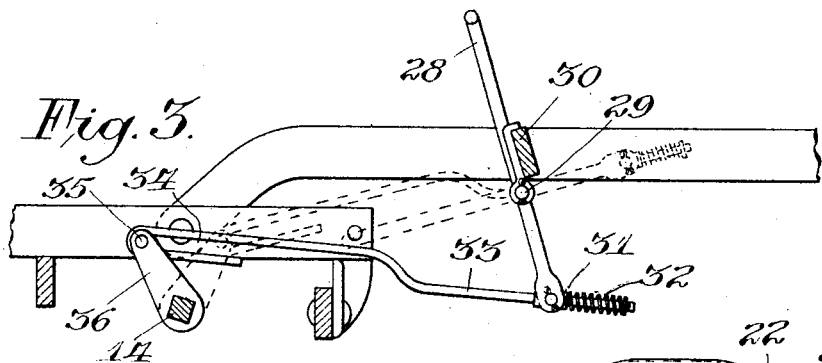
Fig. 3.
Fig. 5.
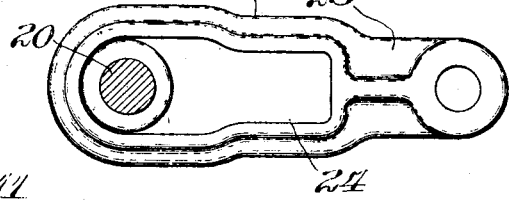
Fig. 4.
Inventor.
Samuel K. Dennis,
By N. P. Doolittle
Atty.

Patented Aug. 20, 1929.

1,725,446

UNITED STATES PATENT OFFICE.

SAMUEL K. DENNIS, OF CHICAGO, ILLINOIS, ASSIGNOR TO INTERNATIONAL HARVESTER COMPANY, OF CHICAGO, ILLINOIS, A CORPORATION OF NEW JERSEY.

PLANTER-VALVE MECHANISM.

Application filed December 17, 1923. Serial No. 681,219.

This invention relates to the seed-dropping mechanism such as housed in the boots or shanks of corn planters, and its object is to provide simple and efficient actuating and control means for the second-drop valves of convertible check-row and drill planters of the cumulative drop type.

In planters of the type stated, special provision must be made for holding both the upper and lower valves of the second-drop mechanism open at the same time when it is desired to change from hill drop to drill planting, and the special object of this invention is to provide a construction that will permit that to be done, in the two or more planting units on the planter simultaneously, by actuation of a single control element located at a convenient point on the planter frame. The invention accordingly resides in the novel combination of elements and construction of parts, or the equivalents thereof, constituting the actuating and control devices for the second-drop, as hereinafter more particularly described and claimed.

In the drawings accompanying this specification:

Fig. 1 is a vertical section from front to back through a boot or shank of a planter showing the valves closed and also showing, in dotted lines, the positions of the parts when seed is being expelled from the lower valve;

Fig. 2 is a similar view showing the valves held open for drilling;

Fig. 3 is a side view of the latch device for locking the second-drop valves open, the dotted lines showing the positions of parts when the latch is swung to locking position;

Fig. 4 is a detail plan view of the valve actuating connections; and

Fig. 5 is a detail view of the valve connecting link.

The invention is illustrated in connection with the usual planting unit of a corn planter comprising the runner 10, boot 11 and hopper 12. The hopper contains seed dispensing mechanism driven by a transverse shaft shown in section at 13, the seed being dispensed through the outlet 12$^a$. Two or more such units may be on the planter, and the seed dropping mechanisms are all controlled by a transverse rock-shaft 14 journaled on the planter frame slightly in advance of the boots 11. The shaft 14 carries the usual check forks 15 for engagement with a check-row wire to intermittently rock the shaft 14 and cause successive actuations of the seed dispensing and dropping mechanisms for planting in spaced hills. When it is desired to change from intermittent drop to continuous drop, as in drill planting, it becomes necessary to swing and lock the valve mechanism in open position and to continuously drive the dispensing mechanism, and the invention is embodied in the improved means for locking and releasing the second-drop valve member and its actuating means, now to be described.

The dropping mechanism comprises two principal elements, namely, a tubular double valve element 16 pivoted on a transverse axis within the boot 11 at 16$^a$ and having upper and lower valve plates 17 and 18, the upper plate having the angular extension 18$^a$ for closing the outlet 12$^a$; and a plunger 19 pivotally suspended within the boot on a pin 20 connecting the twin arms 21 fixed on rock-shaft 14. The rock-arms 21 swing downwardly when shaft 14 is rocked, forcing the lower end of the plunger against the lower valve plate 18 and causing the valve member 16 to swing on its pivot to the dotted line position of Fig. 1, thereby opening the outlet 12$^a$ to release a new charge of seed while discharging the seed accumulated on the lower valve plate, in the manner known to those skilled in the art and more particularly described, for instance, in the patent to Graham, No. 757,399, April 12, 1904.

As novel means for controlling the action of the double valve 16 and for locking this valve in wide open position to permit free and continuous dropping of the seed from the outlet 12$^a$, a loose connection or coupling is provided between the upper valve plate 17 and the upper end of the plunger 19, this coupling comprising a link 22 which has a short shank 23 pivoted to the valve plate and its main portion or body open or slotted, as at 24, for sliding pivotal engagement with the pin 20 supporting the upper end of the plunger 19. A freely movable lost motion coupling is thus provided between the valve 16 and the upper end of the plunger 19, as the pin 20 can slide or move freely in slot 24 to accommodate the operation of the plunger, the length of the slot 24 being just sufficient to permit the normal downward swing of the rock-arm 21 under the action of the check-wire when hill planting. In order to insure proper seating of the valve member 16, a coil spring 25 is housed in a projecting chamber 25ª in the rear wall of the boot and bears against a lug 25ᵇ on valve plate 18 tending to retain valve 16 in closed position. Referring to Figs. 1 and 2 of the drawings, it is to be noted that in Fig. 2 the valve mechanism is in condition for drilling, the upper valve being open and the valve element 16 being moved rearwardly to such an extent that the lower valve cannot be closed by the lower end of the plunger 19, whereas the dotted line positions of the valve element in Fig. 1 of the drawings shows the extreme of the counter-clockwise movement of the valve elements 16 and 17 during the normal hilling operation. As before stated, the slot 24 permits normal throw of the rock-arm 21 and plunger 19 downwardly, but, if this is exceeded, the pin 20 engages at the end of the slot and exerts a pull on the link 22 which swings the valve 16 beyond the dotted line position of Fig. 1 to the wide open position of Fig. 2. In order to effect this excess swing and lock the parts with the valve 16 in position for drilling, there is provided a foot lever 28 pivoted on the planter frame at 29 just below a stop 30, which may be a cross bar on the planter frame. At its lower end, lever 28 is pivoted to a slidable sleeve 31 that bears against a coil spring 32 carried on the rear end of a rod 33, which has its front end bent over to provide a slideway or slot 34 receiving a pin 35 on the end of an arm 36 fixed to rock-shaft 14. When check-rowing, the lever and link are as shown in full lines in Fig. 3, and pin 35 rides back and forth in slot 34 each time the shaft 14 is rocked. When changing to drill planting, the upper end of lever 28 is pressed forwardly and downwardly, bringing rod 33 slightly over dead center and compressing spring 32, at which point the rod engages the under side of stop 30 and the mechanism remains locked with the rock-arm 21 swung to the limit of movement and with valve 16 pulled over to wide open position, affording open passage for the seed being continuously dropped from outlet 12ª.

With the construction described the driver on the planter has only to swing foot lever 28 to change from hill-dropping to drilling and vice versa, all the planting units being controlled by the one lever simultaneously, the parts comprising the novel mechanism employed being few and simple and reliable in operation.

While the construction described exemplifies the preferred form of the invention, it will be evident that other forms of freely movable connections having the required lost motion could be substituted for the present link 22, and also that other means for locking the mechanism might be used without departure from the gist of the invention as defined in the following claims.

What is claimed is:

1. The combination with the valves of a second-drop valve mechanism, a rock shaft, a rock-arm, means connected to the rock arm for operating the valve mechanism for producing normal and periodic opening of a valve during the operation of hilling, means for moving the rock-arm beyond the limit of its normal path of movement in hilling and for locking it in that position for drilling, and a lost motion connection permanently connecting the rock-arm to the valves, said lost motion connection being inoperative during hilling but acting to move and hold the valves in open position when the rock-arm is moved to its drilling position.

2. In a seed-dropping mechanism for corn planters, a planter boot, an upper valve in said boot, a lower valve in said boot, a rock shaft oscillatably supported adjacent the boot, a rock-arm, a member connected to the rock-arm and acting to normally operate said valves, means for swinging the rock shaft to drilling position and locking it in that position, and a lost motion connection between the rock-arm and the valves acting to hold said valves open while the rock shaft is in drilling position.

3. In a corn planter, a planter boot, an upper valve, a lower valve, a valve connection causing said valves to be operated simultaneously, a rock shaft, a rock-arm, means connected to the rock-arm for normally actuating the valves during the hilling operation, and a lost motion connection between the valve connection and the rock-arm effective to move the valves to open position and to hold them in that position for drilling, said lost motion connection being inoperative during hilling.

4. In a seed-dropping mechanism for corn planters, a planter boot, an upper valve in said boot, a lower valve in said boot, a rock-shaft oscillatably supported adjacent the boot, a rock-arm, a seed ejecting plunger connected to the rock-arm and acting during a hilling operation to control the alternate opening and closing of the valves, means for swinging the rockshaft to drilling position and locking it in that position, and means connecting the rock-arm and the valves and acting to move the valves to produce an unobstructed passageway through the boot when the rockshaft is moved beyond the range of its movement during hilling.

5. A corn planter comprising, in combination, a planter boot, an upper valve in the boot, a lower valve in the boot, valve operating means for actuating the valves during hilling, a rockshaft, and a connecter operatively associating the valves and the valve operating means so that movement of the rockshaft to a position beyond its hilling range of movement will create an uninterrupted passageway through the planter boot.

6. A seed-dropping mechanism for corn planters comprising, in combination, a planter boot, a rockshaft, upper and lower valves in the boot, a plunger for controlling the opening and closing of said valves during the hilling operation, and a connecter constantly associated with the rockshaft and the plunger and operable by the rockshaft beyond its hilling range of movement to move both valves to drilling position.

7. In a seed-dropping mechanism for corn planters, a planter boot, an upper valve in said boot, a lower valve in said boot, a rockshaft, a rock-arm, means connected to the rock-arm and acting to normally control the opening and closing of said valves during a hilling operation, lever mechanism for swinging the rockshaft to drilling position and locking it in that position, and a connection between the rock-arm and the valves acting to move the valves independently of said means in response to a movement of the rockshaft beyond its hilling range.

8. In a seed-dropping mechanism for corn planters, a planter boot affording a seed passageway, an upper valve in the boot, a lower valve in the boot, a rockshaft, operating means connected to the rockshaft so as to control alternately the opening and closing of the valves during hilling and always maintain a complete obstruction in said passageway, means for swinging the rockshaft to drilling position and locking it in that position, and a lost motion connection between the rockshaft and the valves operative to move both valves beyond their hilling range to create an uninterrupted passageway through the boot when the rockshaft is moved to drilling position.

9. The combination with a second-drop valve mechanism including a pivoted double valve member, a rock-arm, and a plunger pivotally connected to the rock-arm and adapted to actuate the valve member; of a link pivotally connected to one of said elements and having limited sliding movement with respect to one of the remaining elements.

10. The combination with a second-drop valve mechanism including a pivoted double valve member, a rock-arm, and a plunger pivotally connected to the rock-arm and adapted to actuate the valve member; of a link pivoted to the valve and having a lost motion connection with the plunger.

11. The combination with a second-drop valve mechanism including a pivoted double valve member, a rock-arm, and a plunger pivotally connected to the rock-arm by means of a pivot pin and adapted to actuate the valve member; of a link pivoted to a part of said valve and provided with a slot receiving the pivot pin connecting the rock-arm and plunger.

12. The combination with a second-drop valve mechanism including a pivoted double valve member, a rock-arm, and a plunger pivoted to said rock-arm and adapted to actuate the valve member; of means connecting a part of the valve with the upper end of the plunger including a lost motion coupling permitting normal hilling operation of the rock-arm and plunger, and lever mechanism for swinging and locking the rock-arm beyond its normal hilling throw in one direction, said mechanism opening the valve through a pull on said connecting means.

13. The combination with a second-drop valve mechanism including a pivoted double valve member, a rockshaft, a rock-arm, and a plunger pivotally connected to the rock-arm and adapted to normally actuate the valve member; of a lost motion coupling connecting the valve member with the upper end of the plunger, and locking means for swinging and locking the rock-arm beyond its normal throw in one direction, thereby opening the valve through a pull on said coupling, said locking means comprising a lever, and a resilient connection between the lever and rock-arm including a link adapted to form a dead-center lock with the lever.

14. In a second-drop mechanism for corn planters, a planter boot, a plurality of second-drop valves, a rockshaft, a rock-arm affixed to said shaft, and a device operably connected to the rock-arm by means of a lost motion connection for maintaining an uninterrupted passage-way through the planter boot when the rockshaft is moved to drilling position.

15. A second-drop mechanism for corn planters comprising, in combination, a planter boot having a seed passage-way therethrough, a plurality of second-drop valves operable to alternately obstruct and open parts of said passage-way, a check fork operated rockshaft, a rock-arm affixed to said shaft, a device connected to the rock-arm and effective during hilling operation to successively open and close each of said valves, and a lost motion connection constantly connecting said valves and said rockshaft and effective upon said valves when the rockshaft is moved beyond the range of its drilling operation to so position the valves that an uninterrupted passage-way is maintained through the boot.

16. A second-drop mechanism for corn planters comprising, in combination, a planter boot having a seed passage-way therethrough, a plurality of second-drop valves located in said passage-way and alternately operable during hilling so as to always maintain an obstructed passage-way through the boot, a rockshaft, a rock-arm fixed to the shaft, a device connecting the valves, means carried by the rockshaft for engaging said device to successively close and open each valve during hilling, and a lost motion connection between said device and said means operable as a consequence of movement of the rockshaft beyond its drilling range to so move the valves as to maintain an unobstructed passage-way through the boot.

In testimony whereof I affix my signature.

SAMUEL K. DENNIS.